US012139374B2

(12) United States Patent
Pahlke et al.

(10) Patent No.: US 12,139,374 B2
(45) Date of Patent: Nov. 12, 2024

(54) METHOD AND DEVICE FOR MONITORING AN ELEVATOR SYSTEM

(71) Applicant: Otis Elevator Company, Farmington, CT (US)

(72) Inventors: Derk Oscar Pahlke, Berlin (DE); Tadeusz Pawel Witczak, Farmington, CT (US); Craig Drew Bogli, Avon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1401 days.

(21) Appl. No.: 16/680,979

(22) Filed: Nov. 12, 2019

(65) Prior Publication Data

US 2020/0148506 A1 May 14, 2020

(30) Foreign Application Priority Data

Nov. 12, 2018 (EP) .................................... 18205695

(51) Int. Cl.
*B66B 5/00* (2006.01)
*B66B 1/28* (2006.01)
(Continued)

(52) U.S. Cl.
CPC ............ *B66B 5/0025* (2013.01); *B66B 1/285* (2013.01); *B66B 1/3461* (2013.01); *B66B 13/143* (2013.01)

(58) Field of Classification Search
CPC ..... B66B 5/0025; B66B 1/285; B66B 1/3461; B66B 13/143; B66B 5/0037; B66B 5/00; B66B 5/0018
See application file for complete search history.

(56) References Cited

U.S. PATENT DOCUMENTS 5,390,765 A 2/1995 Ujihara et al.
6,437,315 B1 8/2002 Skalski
(Continued)

FOREIGN PATENT DOCUMENTS

CN 201296586 Y 8/2009
CN 107010505 A 8/2017
(Continued)

OTHER PUBLICATIONS

European Examination Report for Application No. 18205695.2; Issued Nov. 18, 2021; 4 Pages.
(Continued)

*Primary Examiner* — Jeffrey Donels
(74) *Attorney, Agent, or Firm* — CANTOR COLBURN LLP

(57) ABSTRACT

A monitoring device (20, 22), which is configured for monitoring movement of at least one component (6, 12) of an elevator system (2), includes an acceleration sensor (24) and a controller (26). The acceleration sensor (24) is configured for detecting accelerations (g, g') of the at least one component (6, 12) and providing a corresponding acceleration signal (28, 30). The controller (26) is configured for determining peaks (28*a*, 28*b*, 30*a*, 30*b*) having positive or negative signs in the detected acceleration signal (28, 30); determining the signs of the detected peaks (28*a*, 28*b*, 30*a*, 30*b*); and determining that the moving direction of the at least one component (6, 12) has changed when two subsequent peaks (28*a*, 28*b*, 30*a*, 30*b*) of the acceleration signal (28, 30) having the same sign are detected.

13 Claims, 3 Drawing Sheets

(51) Int. Cl.
*B66B 1/34* (2006.01)
*B66B 13/14* (2006.01)

(56) References Cited

U.S. PATENT DOCUMENTS

| | | | | |
|---|---|---|---|---|
| 8,123,003 | B2 | 2/2012 | Meri et al. | |
| 8,408,364 | B2 | 4/2013 | Kangas | |
| 9,033,114 | B2 | 5/2015 | Mizon | |
| 9,496,753 | B2 | 11/2016 | Haapaniemi | |
| 9,771,243 | B2 | 9/2017 | Kattainen et al. | |
| 9,809,419 | B2 | 11/2017 | Otsuka et al. | |
| 9,979,412 | B2 | 5/2018 | Kang et al. | |
| 2005/0077117 | A1* | 4/2005 | Shrum, III | B66B 5/0087 187/391 |
| 2006/0020416 | A1* | 1/2006 | Karasek | B66B 1/3492 702/141 |
| 2008/0173502 | A1 | 7/2008 | Tyni et al. | |
| 2011/0016971 | A1 | 1/2011 | Yulkowski et al. | |
| 2014/0330535 | A1* | 11/2014 | Van Den Heuvel | B66B 5/0006 702/141 |
| 2015/0014098 | A1 | 1/2015 | Stolzl et al. | |
| 2016/0304313 | A1 | 10/2016 | Kinnari et al. | |
| 2017/0029244 | A1* | 2/2017 | Madarasz | B66B 5/0037 |
| 2017/0313545 | A1 | 11/2017 | Gerstenmeyer | |
| 2020/0122963 | A1* | 4/2020 | Pahlke | B66B 1/28 |

FOREIGN PATENT DOCUMENTS

| | | | | |
|---|---|---|---|---|
| EP | 0844545 | A2 * | 5/1998 | |
| EP | 2547616 | B1 | 10/2018 | |
| JP | 5794928 | B2 | 10/2015 | |
| WO | 2014005833 | A1 | 1/2014 | |
| WO | WO-2017076734 | A1 * | 5/2017 | B66B 1/28 |

OTHER PUBLICATIONS

European Search Report for application EP 18205695.2, Jun. 3, 2019, 6 pages.

Francik, Jaroslaw, et al., "Real-Time Sensor Data Integration in Vertical Transport System", School of Computer Science and Mathematics Kingston University | School of Public Health, Faculty of MedicineImperial College, available at: http://eprints.kingston.ac.uk/34362/1/1570217117.pdf, accessed Nov. 13, 2019, 6 pages.

Sabatini, Angelo Maria, et al., "A Sensor Fusion Method for Tracking Vertical Velocity and Height Based on Inertial and Barometric Altimeter Measurements", Sensors (Basel). Aug. 2014; 14(8): 13324-13347, 10 pages.

* cited by examiner

METHOD AND DEVICE FOR MONITORING AN ELEVATOR SYSTEM

FOREIGN PRIORITY

This application claims priority to European Patent Application No. 18205695.2, filed Nov. 12, 2018, and all the benefits accruing therefrom under 35 U.S.C. § 119, the contents of which in its entirety are herein incorporated by reference.

BACKGROUND

The invention relates to a method and to a device for monitoring an elevator system, in particular for monitoring a linear movement of a component of an elevator system.

An elevator system typically comprises at least one elevator car moving along a hoistway between a plurality of landings, and a drive unit, which is configured for driving the elevator car. An elevator system usually further comprises elevator doors at the landings and/or at the elevator car in order to allow passengers to transfer between the elevator car and one of the landings.

It would be beneficial to be able to keep track of the operation of the elevator system by monitoring the movement of at least one of the components of the elevator system, such as the elevator car and/or at least one of the elevator doors. Information collected by monitoring the movement at least one component of the elevator system for example may be used for detecting wear and/or predicting upcoming maintenance actions of the elevator system. The information in particular may be used for implementing "predictive maintenance", i.e. for optimizing the maintenance of the elevator system based on its actual operation.

Thus, there is a desire for reliably monitoring the operation of at least one component of an elevator system easily and at low costs.

BRIEF DESCRIPTION

According to an exemplary embodiment of the invention, a method of determining a change of direction of a linearly moving component of an elevator system includes detecting an acceleration of the component parallel to the direction of its linear movement over time and providing a corresponding acceleration signal; determining peaks having positive or negative signs of the detected acceleration signal; determining the signs of the peaks and determining that the moving direction of the component has changed when two subsequent peaks having the same sign, i.e. without a peak having a different (opposite) sign being present in between the two peaks with the same sign, are detected.

According to an exemplary embodiment of the invention, a monitoring device, which is configured for monitoring movement of at least one linearly moving component of an elevator system, includes an acceleration sensor and a controller. The acceleration sensor is configured for detecting accelerations of the at least one component parallel to the direction of its linear movement and for providing a corresponding acceleration signal. The controller is configured for determining peaks, which may have positive or negative signs, of the detected acceleration signal. The controller is further configured for determining the signs of the peaks and for determining that the moving direction of the at least one component has changed, when two subsequent peaks having the same sign, i.e. without a peak having a different (opposite) signs being present in between the two peaks with the same sign, are detected.

A monitoring device and a method according to exemplary embodiments of the invention allow autonomously determining that the moving direction of a component of an elevator system has changed. A monitoring device and/or a method according to exemplary embodiments of the invention may be employed autonomously, i.e. without receiving support from other devices. There in particular is no need for starting the monitoring from a predefined initial state or for receiving additional information from the elevator system and/or an additional sensor.

Thus, exemplary embodiments of the invention provide a reliable monitoring device and a reliable method for monitoring the operation, in particular the movement, of a linearly moving component of an elevator system, which may be implemented easily at low costs. As a monitoring device according to exemplary embodiments of the invention operates autonomously, there is no need for redesigning existing elevator systems. In consequence, monitoring devices according to exemplary embodiments of the invention may be added easily to existing elevator systems.

A number of optional features are set out in the following. These features may be realized in particular embodiments, alone or in combination with any of the other features.

The method may include detecting a time period of basically zero acceleration in between the two subsequent peaks having the same sign and setting a point of time within said time period as a zero point of a velocity of the at least one component. This allows for easily and reliably setting a zero point of the velocity of the at least one component.

After such a zero point has been set, the current velocity of the respective component may be determined by integrating successively detected accelerations over time. Thus, after the zero point has been set, the velocity of the component may be monitored easily and reliably.

In the present context, "basically zero acceleration" is to be understood as corresponding to an acceleration signal having an absolute value which is below a given limit. Said limit is set for eliminating the influence of noise comprised in the acceleration signal. The skilled person understands how to set an appropriate limit ("noise threshold") within the respective configuration. Said limit is usually low compared to the height of the peak of the acceleration signal.

A change of position of the component may be determined by integrating the velocity determined from the acceleration signal over time, i.e. by integrating the acceleration signal twice over time.

In case the position of the monitored component, e.g. the position of the elevator car within the hoistway, is determined once after the zero point of the velocity has been set, the current position of the component may be determined from said determined position and the calculated change of position. Means for determining the position of the component, such as positional switches and/or positional sensors, are known to the skilled person.

The acceleration sensor of the monitoring device may be configured for detecting accelerations in the vertical direction. The monitored component in particular may be an elevator car, which usually is accelerated in the vertical direction.

The acceleration sensor of the monitoring device may be configured for detecting accelerations in the horizontal direction. The monitored component in particular may be an elevator door panel configured for moving in a horizontal direction. In elevator systems comprising a horizontally moving elevator car, the monitored component also may be an elevator car moving horizontally.

The method may include detecting wear and/or upcoming malfunctions of the elevator system based on the detected acceleration signals, for example by counting the number of movements (changes of directions) of the at least one monitored component. The method in particular may include predicting necessary maintenance of the elevator system. This allows reducing the costs for maintaining the elevator system without compromising the safety and/or the operational reliability of the elevator system.

The monitoring device may be an autonomous monitoring device comprising its own power supply. The power supply may include a battery and/or an energy harvesting device.

Alternatively or additionally, the monitoring device may be configured for wireless data transmission.

Providing the monitoring device with its own power supply and/or configuring the monitoring device for wireless data transmission avoids the need of running electrical cable to and from the monitoring device. This considerably facilitates the installation and maintenance of the monitoring device.

DRAWING DESCRIPTION

In the following, exemplary embodiments of the invention are described in more detail with respect to the enclosed figures:

FIG. 1 schematically depicts an elevator system in which a monitoring device according to an exemplary embodiment of the invention may be employed.

DETAILED DESCRIPTION

Figure 1:
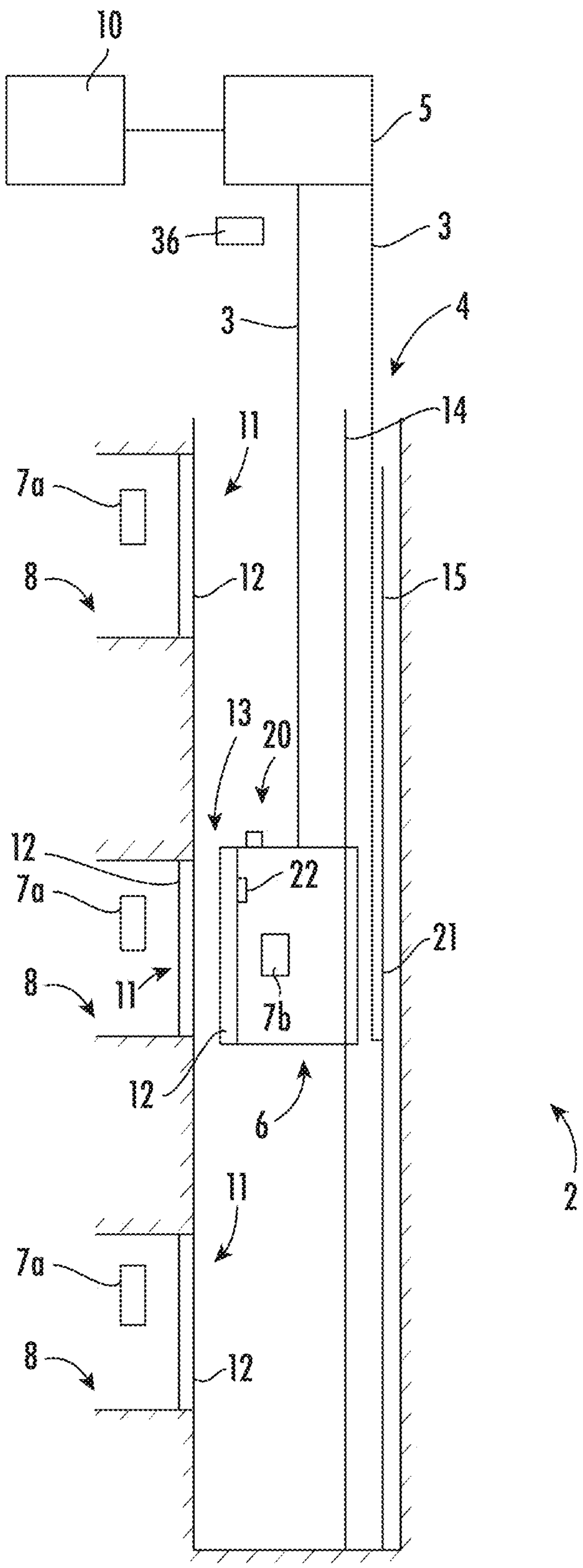

FIG. 1 schematically depicts an elevator system 2 in which a monitoring device 20, 22 according to an exemplary embodiment of the invention may be employed.

The elevator system 2 includes an elevator car 6 movably arranged within a hoistway 4 extending between a plurality of landings 8. The elevator car 6 in particular is movable along a plurality of car guide members 14, such as guide rails, extending along the vertical direction of the hoistway 4. Only one of said car guide members 14 is depicted in FIG. 1.

Although only one elevator car 6 is depicted in FIG. 1, the skilled person will understand that exemplary embodiments of the invention may include elevator systems 2 having a plurality of elevator cars 6 moving in one or more hoistways 4.

The elevator car 6 is movably suspended by means of a tension member 3. The tension member 3, for example a rope or belt, is connected to a drive unit 5, which is configured for driving the tension member 3 in order to move the elevator car 6 along the height of the hoistway 4 between the plurality of landings 8, which are located on different floors.

Each landing 8 is provided with a landing door 11, and the elevator car 6 is provided with a corresponding elevator car door 13 for allowing passengers to transfer between a landing 8 and the interior of the elevator car 6 when the elevator car 6 is positioned at the respective landing 8. Each of the landing doors 11 and the elevator car door 13 may be provided with at least one movable elevator door panel 12, respectively.

The exemplary embodiment shown in FIG. 1 uses a 1:1 roping for suspending the elevator car 6. The skilled person, however, easily understands that the type of the roping is not essential for the invention and different kinds of roping, e.g. a 2:1 roping or a 4:1 roping may be used as well.

The elevator system 2 includes further a counterweight 21 attached to the tension member 3 opposite to the elevator car 6 and moving concurrently and in opposite direction with respect to the elevator car 6 along at least one counterweight guide member 15. The skilled person will understand that the invention may be similarly applied to elevator systems 2 which do not comprise a counterweight 21.

The tension member 3 may be a rope, e.g. a steel core, or a belt. The tension member 3 may be uncoated or may have a coating, e.g. in the form of a polymer jacket. In a particular embodiment, the tension member 3 may be a belt comprising a plurality of polymer coated steel cords (not shown). The elevator system 2 may have a traction drive including a traction sheave for driving the tension member 3.

In an alternative configuration, which is not shown in the figures, the elevator system 2 may be an elevator system 2 without a tension member 3, comprising e.g. a hydraulic drive or a linear drive. The elevator system 2 may have a machine room (not shown) or it may be a machine room-less elevator system 2.

The drive unit 5 is controlled by an elevator control 10 for moving the elevator car 6 along the hoistway 4 between the different landings 8.

Input to the elevator control 10 may be provided via landing control panels 7*a*, which are provided on each landing 8 close to the landing doors 11, and/or via an elevator car control panel 7*b*, which is provided inside the elevator car 6.

The landing control panels 7*a* and the elevator car control panel 7*b* may be connected to the elevator control 10 by means of electrical wires, which are not depicted in FIG. 1, in particular by an electric bus, or by means of wireless data connections.

For monitoring the operation of the elevator system 2, in particular, for monitoring the movement of the elevator car 6 or one of the elevator door panels 12, the elevator system 2 may be provided with at least one monitoring device 20, 22.

A monitoring device 20, 22 in particular may be attached to the elevator car, to an elevator door panel 12 of the elevator car door 13 and/or to an elevator door panel 12 of a landing door 11, respectively.

Figure 2:
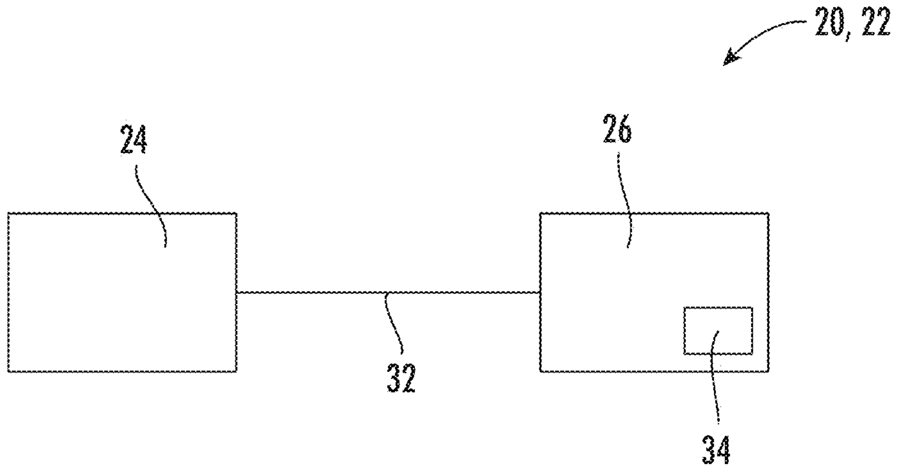
FIG. 2 depicts a schematic view of a monitoring device according to an exemplary embodiment of the invention.

FIG. 2 depicts a schematic view of a monitoring device 20, 22 according to an exemplary embodiment of the invention.

Figure 3:
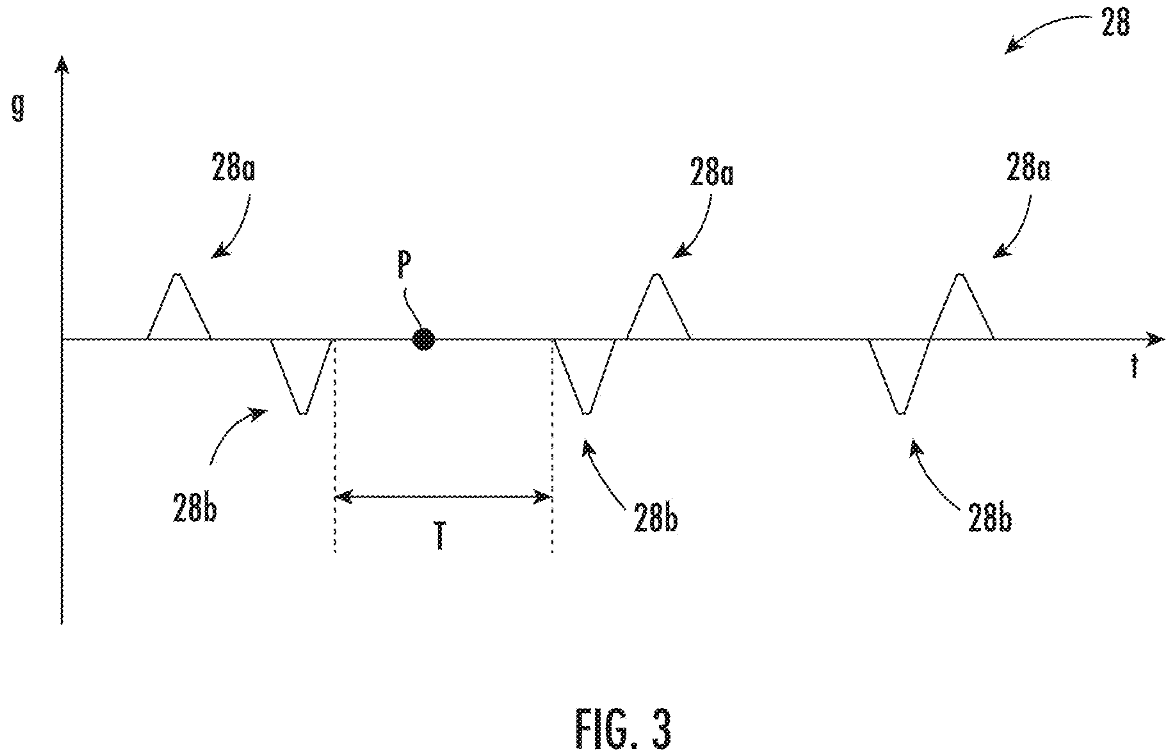
FIG. 3 illustrates an example of an acceleration signal indicating the acceleration of an elevator car as a function of time.
Figure 4:
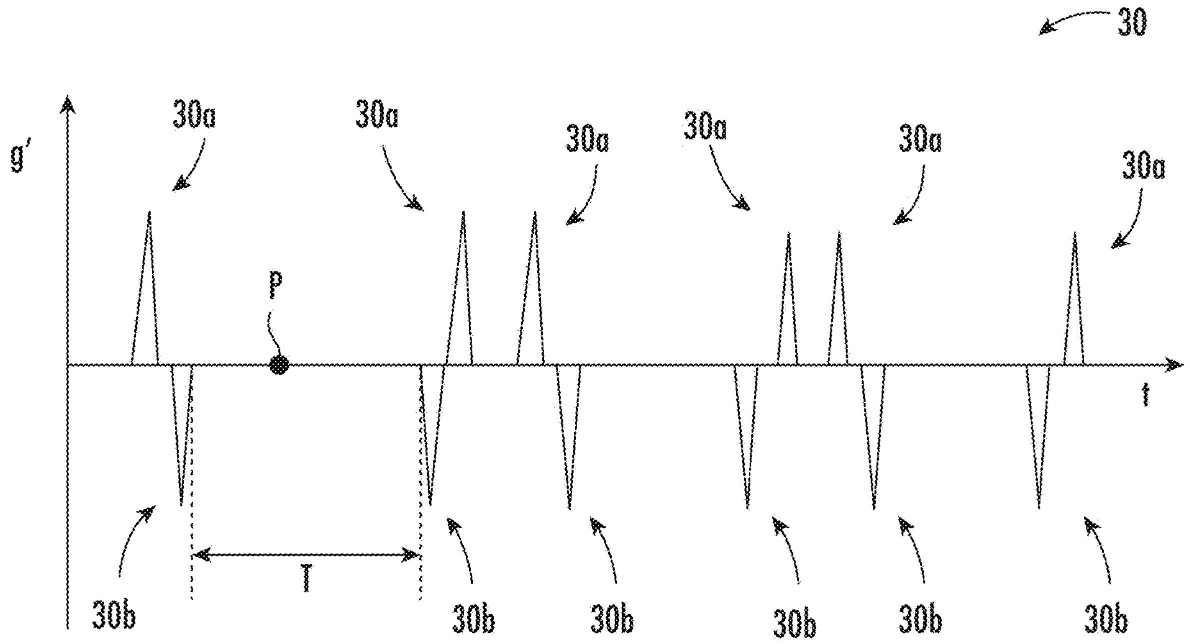
FIG. 4 illustrates an example of an acceleration signal indicating the acceleration of an elevator door panel as a function of time.

The monitoring device 20, 22 includes an acceleration sensor 24 configured for detecting accelerations g, g' of at least one component 6, 12 of the elevator system 22 and for providing a corresponding acceleration signal 28, 30 indicating the detected acceleration g, g' as a function of time t (see FIGS. 3 and 4). Acceleration sensors 24 with the desired characteristics are known in the art. The component 6, 12 monitored by the acceleration sensor 24 may be an elevator car 6 or an elevator door panel 12, as it has been discussed before. The acceleration sensor 24 in particular is configured for detecting accelerations of the component 6, 12 oriented parallel to its usual direction of movement, i.e. parallel to a vertical direction in case of an elevator car 6, and parallel to a horizontal direction in case of an elevator door panel 12.

Simplified examples showing only those characteristics of acceleration signals 28, 30 provided by the acceleration sensor 24 which are relevant in the context of the present invention are plotted in FIGS. 3 and 4, respectively.

FIG. 3 illustrates an example of an acceleration signal 28 representing the acceleration g of the elevator car 6 as a function of time t, and FIG. 4 illustrates an example of an acceleration signal 30 representing the acceleration g' of an elevator door panel 12 as a function of time t.

As can be seen from FIGS. 3 and 4, each acceleration signal 28, 30 comprises a plurality of positive peaks 28*a*, 30*a* and a plurality of negative peaks 28*b*, 30*b*, respectively.

The monitoring device 20, 22 further includes a controller 26 (see FIG. 2) which is configured for receiving the acceleration signal 28, 30 provided by the acceleration sensor 24. The controller 26 is configured for identifying the peaks 28*a*, 28*b*, 30*a*, 30*b* in the detected acceleration signal 28, 30, and in particular for determining the signs of said peaks 28*a*, 28*b*, 30*a*, 30*b*. The controller 26 may be the same as the elevator controller 10 and/or may be separate. In one embodiment, the controller 26 may be collocated with the acceleration sensor 24. In one embodiment, the controller 26 may be located elsewhere at the elevator 2 installation. In one embodiment, the controller 26 may be remotely located and/or in the cloud.

The controller 26 may be implemented as an electronic hardware circuit and/or as a microprocessor running an appropriate software program.

As exemplarily depicted in FIG. 3, the acceleration signal 28 representing the acceleration g of an elevator car 6 comprises with increasing time t, i.e. from left to right in FIG. 3, a positive peak 28*a*, followed by two successive negative peaks 28*b*, which are followed in this order by a second positive peak 28*a*, another negative peak 28*b*, and a third positive peak 28*a*.

As the state of movement of the elevator car 6 at the beginning of the time sequence depicted in FIG. 3 is not known, the first positive peak 28*a* of the acceleration g may correspond to accelerating a stationary elevator car 6 for moving upwards. Alternatively the first positive peak 28*a* may correspond to decelerating and stopping an elevator car 6 which was moving downwards.

I.e. the moving state, in particular the velocity, of the elevator car 6 cannot be determined unambiguously from a single peak 28*a*, 28*b* alone.

However, in the example depicted in FIG. 3, the first positive peak 28*a* is followed by two successive negative peaks 28*b*, with the acceleration g being zero in between. There in particular is no peak 28*a* having an opposite (positive) sign in between the two successive negative peaks 28*b*. Such a pattern of successive peaks 28*a*, 28*b* having the same sign indicates that the elevator car 6 has been successively accelerated twice with an acceleration g having the same sign, in particular a negative sign in the example depicted in FIG. 3.

When an elevator system 2 is operated, the only situation generating a sequence of accelerations g of the elevator car 6 resulting in a pattern of two successive negative peaks 28*b*, as it is illustrated in FIG. 3, is a situation in which an elevator car 6 moving upwards is decelerated and stopped, thereby generating the first negative peak 28*b*, and then the elevator car 6 is accelerated downwardly for starting a downward movement, which generates the second negative peak 28*b*.

Similarly, decelerating and stopping an elevator car 6, which was moving downwards at the beginning, and then accelerating said elevator car 6 to move upwards, would result in a signal (not shown) comprising two successive positive peaks 28*a*.

Thus, an acceleration signal 28 comprising two successive peaks 28*a*, 28*b* having the same sign without a peak 28*b*, 28*a* having an opposite sign being present in between the two successive peaks 28*a*, 28*b* indicates that the direction of movement of the elevator car 6 has been reversed, and that the elevator car 6 did not move during the time period T of zero acceleration in between the two successive peaks 28*a*, 28*b*.

In consequence, any point of time P within the time period T between the two successive peaks 28*a*, 28*b* having the same sign may be used for setting a zero point of the velocity of the elevator car 6.

Starting from said zero point, the current velocity of the elevator car 6 may be determined by integrating the detected acceleration signal 28 over time t.

In case the position of the elevator car 6 is determined once, e.g. by means of a positional switch (not shown) provided at a predefined position within the hoistway 4, the current position of the elevator car 6 may be determined by integrating the determined the velocity over time t, i.e. by integrating the detected acceleration signal 28 twice over time t.

In case of an elevator door panel 12, the zero point of the velocity may be determined similarly. In this case, horizontal accelerations g' are detected instead of vertical accelerations g. The direction of movement of an elevator door panel 12 is reversed after the landing door 11 or the elevator car door 13 has been completely opened (or closed) and is then moved for being closed (or opened) again.

The monitoring device 20, 22 may comprise its own power supply 34, such as a battery or an energy harvesting device, in order to allow installing the monitoring device 20, 22 at the elevator car 6 without providing additional wiring.

In order to avoid the need for additional wiring, the output signal provided by the controller 26 may be emitted via wireless data transmission, such as WLAN, Bluetooth®, optical data transmission, or a similar technology in order to be received by an appropriate receiver 36 (see FIG. 1) provided within or next to the hoistway 4.

The acceleration sensor 24 may be integrated with the controller 26 forming a compact monitoring device 20, 22. Alternatively, the acceleration sensor 24 may be provided separately form the controller 26.

The acceleration signal 28, 30 may be transmitted from the acceleration sensor 24 to the controller 26 via a physical signal line 32 (see FIG. 2). Alternatively, in order to avoid the need for a physical signal line 32, the acceleration signal 28, 30 may be transmitted from the acceleration sensor 24 to the controller 26 employing wireless data transmission technology including for example WLAN, Bluetooth®, optical data transmission, or a similar technology.

Exemplary embodiments of the invention allow the monitoring device 20, 22 to operate autonomously without receiving further information/input signals in additional to the acceleration signal 28, 30 provided by the acceleration sensor 24. According to exemplary embodiments of the invention, it in particular is not necessary to initialize the monitoring device 20, 22. Instead, the monitoring device 20, 22 will synchronize by itself with the movement of the monitored component 6, 12 as it has been described before. This allows for an easy and fast installation of the monitoring device 20, 22.

A monitoring device 20, 22 according to an exemplary embodiment of the invention in particular may be installed easily without redesign the elevator system 2. A monitoring device 20, 22 according to an exemplary embodiment of the invention therefore in particular may be added to existing elevator systems 2 with little additional effort.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention shall not be limited to the particular embodiment disclosed, but that the invention includes all embodiments falling within the scope of the dependent claims.

REFERENCES

2 elevator system
3 tension member
4 hoistway
5 drive unit
6 elevator car
7*a* landing control panel
7*b* elevator car control panel
8 landing
10 elevator control
11 landing door
12 elevator door panel
13 elevator car door
14 car guide member
15 counterweight guide member
20, 22 monitoring device
24 acceleration sensor
26 controller
28,30 acceleration signal
28*a*, 30*a* positive peaks of the acceleration signal
28*b*, 30*b* negative peaks of the acceleration signal
32 signal line
34 power supply
36 receiver
g acceleration of the elevator car
g' acceleration of a door panel
t time
T time period between two successive peaks having the same sign

What is claimed is:

1. Method of determining a change of direction of a linearly moving component (6, 12) of an elevator system (2), wherein the method includes:

detecting accelerations (g, g') of the component (6, 12) over time and providing a corresponding acceleration signal (28, 30);

determining peaks (28*a*, 28*b*, 30*a*, 30*b*) having positive or negative signs in the detected acceleration signal (28, 30);

determining the signs of the determined peaks (28*a*, 28*b*, 30*a*, 30*b*); and determining that the moving direction of the component (6, 12) has changed when two subsequent peaks (28*a*, 28*b*, 30*a*, 30*b*) having the same sign are detected;

counting a number of changes of direction of the component;

predicting necessary maintenance of the elevator system (2) based on the number of changes of direction of the component.

2. Method according to claim 1, wherein the method further includes detecting a time period (T) of zero acceleration in between the two subsequent peaks (28*a*, 28*b*, 30*a*, 30*b*) of the acceleration (g, g') and setting a point of time (P) within said time period (T) as a zero point of a velocity of the at least one component (6, 12).

3. Method according to claim 2, wherein the method includes determining the velocity of the component (6, 12) by integrating the detected acceleration signal (28, 30) over time starting from the zero point.

4. Method according to claim 3, wherein the method includes determining a change of position of the component (6, 12) by integrating the determined velocity over time.

5. Method according to claim 1, wherein the component (6, 12) is an elevator car (6) configured for moving in a vertical direction.

6. Method according to claim 1, wherein the component (6, 12) is an elevator door panel (12) configured for moving in a horizontal direction.

7. Monitoring device (20, 22) configured for monitoring movement of at least one linearly moving component (6, 12) of an elevator system (2), wherein the monitoring device (20, 22) includes:

an acceleration sensor (24) configured for detecting accelerations (g, g') of the at least one component (6, 12) and providing a corresponding acceleration signal (28, 30); and a controller (26) configured for:

determining peaks (28*a*, 28*b*, 30*a*, 30*b*) having positive or negative signs in the detected acceleration signal (28, 30); determining the signs of the detected peaks (28*a*, 28*b*, 30*a*, 30*b*);

determining that the moving direction of the at least one component (6, 12) has changed when two subsequent peaks (28*a*, 28*b*, 30*a*, 30*b*) having the same sign are detected;

counting a number of changes of direction of the component;

predicting necessary maintenance of the elevator system (2) based on the number of changes of direction of the component.

8. Monitoring device (20, 22) according to claim 7, wherein the controller (26) is configured for detecting a time period (T) of zero acceleration in between the two subsequent peaks (28*a*, 28*b*, 30*a*, 30*b*) of the acceleration (g, g') and setting a point of time (P) within said time period (T) as a zero point of a velocity of the at least one component (6, 12).

9. Monitoring device (20, 22) according to claim 7, wherein the controller (26) is configured for determining the velocity of the at least one component (6, 12) by integrating the detected acceleration signal (28, 30) over time starting from the zero point.

10. Monitoring device (20, 22) according to claim 9, wherein the controller (26) is configured for determining a change of position of the at least one component (6, 12) by integrating the determined velocity over time.

11. Monitoring device (20, 22) according to claim 7, wherein the monitoring device (20, 22) is an autonomous monitoring device (20, 22) comprising its own power supply (34), and/or wherein the monitoring device (20, 22) is configured for wireless data transmission.

12. Elevator system (2) comprising:

at least one elevator car (6) configured for traveling along a hoistway (4) between a plurality of landings (8); and at least one monitoring device (20, 22) according to claim 8, wherein the acceleration sensor (24) of the at least one monitoring device (20) is configured for detecting accelerations (g) of the at least one elevator car (6), wherein the acceleration sensor (24) in particular is attached to the at least one elevator car (6).

13. Elevator system (2) according to claim 12, comprising at least one elevator door (11, 13) with at least one movable elevator door panel (12), wherein the acceleration sensor (24) of the at least one monitoring device (22) is configured for detecting accelerations (g') of the at least one elevator door panel (12), wherein the acceleration sensor (24) in particular is attached to the at least one elevator door panel (12).

* * * * *